(12) United States Patent
Axelsson

(10) Patent No.: US 10,881,163 B2
(45) Date of Patent: Jan. 5, 2021

(54) CHINSTRAP CONNECTOR

(71) Applicant: 3M INNOVATIVE PROPERTIES COMPANY, St. Paul, MN (US)

(72) Inventor: Peter L. Axelsson, Borlange (SE)

(73) Assignee: 3M Innovative Properties Company, St. Paul, MN (US)

(*) Notice: Subject to any disclaimer, the term of this patent is extended or adjusted under 35 U.S.C. 154(b) by 342 days.

(21) Appl. No.: 15/769,537

(22) PCT Filed: Nov. 8, 2016

(86) PCT No.: PCT/IB2016/056728
§ 371 (c)(1),
(2) Date: Apr. 19, 2018

(87) PCT Pub. No.: WO2017/081612
PCT Pub. Date: May 18, 2017

(65) Prior Publication Data
US 2018/0310657 A1 Nov. 1, 2018

(30) Foreign Application Priority Data
Nov. 11, 2015 (EP) .................................. 15194028

(51) Int. Cl.
*A42B 3/08* (2006.01)
*F16B 21/06* (2006.01)
(Continued)

(52) U.S. Cl.
CPC .............. *A42B 3/08* (2013.01); *A42B 3/0433* (2013.01); *F16B 21/065* (2013.01); *F16B 21/086* (2013.01)

(58) Field of Classification Search
CPC ....... A42B 3/08; A42B 3/0433; F16B 21/065; F16B 21/06
See application file for complete search history.

(56) References Cited

U.S. PATENT DOCUMENTS 4,793,031 A * 12/1988 Kasai ..................... A45C 13/30
24/324
4,918,753 A * 4/1990 Mermillod ............. A42B 3/185
2/10

(Continued)

FOREIGN PATENT DOCUMENTS

DE         53 504 C      1/1890
DE      203 13 620     10/2003

(Continued)

OTHER PUBLICATIONS

PCT International Search Report from PCT/IB2016/056728, dated Jan. 27, 2017, 5 pages.

*Primary Examiner* — Richale L Quinn
(74) *Attorney, Agent, or Firm* — Sandra K. Nowak

(57) ABSTRACT

A chinstrap connector (10) for a safety helmet (100) has a receptacle for attaching a chinstrap (201) to the chinstrap connector and a stud (12) for attachment of the chinstrap connector to the helmet. The stud is formed by at least two spaced stud retainers (13a, 13b) protruding from a body of the chinstrap connector. The body has a through-hole (14) that opens in the space between the stud retainers and a pin (15) which is placeable through the through-hole into the space to restrict a movement of the stud retainers toward each other. The invention helps facilitating the attachment of a chinstrap to a safety helmet and allows for retrofitting a safety helmet with a chinstrap.

13 Claims, 2 Drawing Sheets

(51) Int. Cl.
*F16B 21/08* (2006.01)
*A42B 3/04* (2006.01)

(56) References Cited

U.S. PATENT DOCUMENTS

| | | | | |
|---|---|---|---|---|
| 5,007,141 | A * | 4/1991 | Gentes | A42B 3/08 2/421 |
| 5,500,951 | A * | 3/1996 | Marchello | A42B 3/08 2/421 |
| 5,774,901 | A * | 7/1998 | Minami | A42B 3/147 2/421 |
| 9,066,550 | B2 * | 6/2015 | Erb | A42B 3/08 |
| 9,095,182 | B1 * | 8/2015 | Rochholz | A42B 3/08 |
| 9,144,270 | B2 * | 9/2015 | Mitchell, Jr. | A44B 11/16 |
| 9,181,968 | B2 * | 11/2015 | Handa | F16B 19/10 |
| D794,254 | S * | 8/2017 | Axelsson | D29/122 |
| 10,113,577 | B2 * | 10/2018 | Kanie | F16B 21/07 |
| 2007/0193006 | A1 * | 8/2007 | Kitano | A44B 17/0011 24/323 |
| 2011/0247120 | A1 * | 10/2011 | Knoedler | A42B 1/247 2/10 |
| 2013/0227767 | A1 * | 9/2013 | Bancroft | A42B 3/08 2/421 |
| 2014/0068843 | A1 * | 3/2014 | Wegener | A42B 3/08 2/421 |
| 2014/0068844 | A1 * | 3/2014 | Infusino | A42B 3/08 2/421 |
| 2015/0230533 | A1 * | 8/2015 | Bancroft | A42B 3/20 2/424 |
| 2018/0352909 | A1 * | 12/2018 | Fava | A42B 3/066 |
| 2020/0128901 | A1 * | 4/2020 | Axelsson | A42B 3/08 |

FOREIGN PATENT DOCUMENTS

| | | |
|---|---|---|
| JP | S48-82018 U | 10/1973 |
| JP | H10-060727 | 3/1998 |
| JP | 2004-270874 | 9/2004 |
| WO | 2014/163404 | 10/2014 |

* cited by examiner

CHINSTRAP CONNECTOR

FIELD OF THE INVENTION

The invention relates to a chinstrap connector for a safety helmet, and in particular to a chinstrap connector which can be reversibly attached to a safety helmet and which can be secured for an unreleasable attachment. The invention further relates to a chinstrap assembly, a method of retrofitting a chinstrap connector to a safety helmet and a kit of part comprising the chinstrap connector.

BACKGROUND ART

Safety helmets are typically used as head protection in different areas, like for example in constructions work zones. Various government agencies and industry organizations define certain requirements and standards for protective gear, including helmets and respirators. In the United States, for example, the National Institute of Occupational Safety and Health (NIOSH) certifies certain safety equipment for the workplace and the American National Standards Institute (ANSI) recommends voluntary consensus industry standards. There are further European Standards related to safety helmets, like for example EN 397. Other agencies and organizations around the world also establish safety standards for helmets and respirators. For safety helmets, some of these standards relate to impact energy attenuation, penetration resistance, force transmission, stiffness, flammability, and head coverage.

To meet these safety requirements and standards, safety helmets usually comprise a rigid outer protective shell of metal or plastic and a suspension system inside the shell. The suspension system serves many purposes, including providing a proper fit of the helmet to the wearer's head, holding the inner part of the helmet away from the wearer's head, distributing the weight of the helmet over a larger area of the wearer's head, and attenuating the force transferred to the wearer's head upon impact of an object with the outer helmet shell. Suspension systems often comprise a headband attached to a crown support assembly which includes crisscrossing crown straps and a crown pad. In some applications, however, additional protection may be desired.

For some applications or workplaces an additional chinstrap is desired or required. The chinstrap typically retains the safety helmet more securely on the wearer's head, in particular as the helmet is exposed to forces in a direction away from the wearer's head as they may occur for example during a fall of the wearer or during overhead work. Although there are safety helmets which are furnished with a chinstrap, in some applications a chinstrap is optional. Therefore there are safety helmets which have a removable chinstrap.

US 2013/0227767 discloses for example a spring loaded female fastener attached to a chinstrap and a matching male fastener attached to a helmet that makes it easy to attach the chinstrap to the helmet and difficult to detach the chinstrap from the helmet unless the plunger is intentionally pulled back. This positive connection takes a tremendous amount of force to disengage unless the plunger is pulled back, thereby keeping the chinstrap attached to the helmet and the helmet in place.

Although existing safety helmets provide the possibility to removably attach a chinstrap thereto there is still a desire for a relatively inexpensive solution which still fulfills the applicable safety standards.

SUMMARY OF THE INVENTION

In one aspect the invention relates a chinstrap connector for a safety helmet. The chinstrap connector comprises a receptacle for attaching a chinstrap to the chinstrap connector and a stud for attachment of the chinstrap connector to the helmet. The stud being formed by at least two spaced stud retainers protruding from a body of the chinstrap connector. The body has a through-hole that opens in the space between the stud retainers. The body further has a pin which is placeable through the through-hole into the space to restrict a movement of the stud retainers toward each other.

The invention is advantageous in hat is allows for quick and easy attachment of a chinstrap to a safety helmet. Further, the invention is advantageous in that it prevents or minimizes the risk of an inadvertent detachment of the chinstrap connector from the helmet even under mechanical load conditions between the chinstrap connector and the helmet as they may occur during wearing of the helmet. The invention further helps maximizing the safety of the wearer of a safety helmet that is furnished with the chinstrap connector of the invention. The invention is also advantageous in that it allows retrofitting of a safety helmet which by default is not prepared for attaching a chinstrap to it. Further, the chinstrap connector of the invention is relatively inexpensive and easy to use.

The chinstrap connector can be used in a snap condition, in which the stud retainers are resiliently movable toward each other, and a secured condition, in which the pin restricts or prevents a movement of the stud retainers toward each other. In the snap condition the chinstrap connector can be snap-fastened in an aperture of a safety helmet. In the snap condition the chinstrap connector can be attached to or detached from the safety helmet by simply pushing or pulling the chinstrap connector relative to the safety helmet, respectively. Accordingly, the chinstrap connector allows for easy attaching and detaching as desired. In the secured condition, in particular with the chinstrap connector attached in the aperture of the safety helmet, a detachment is prohibited.

In an embodiment the body of the chinstrap connector has a first portion, a second portion and a third portion. The first portion, the second portion and the third portion are preferably arranged directly adjacent each other with the first and second portion forming opposite end portions and the third portion being located between. In an initial condition, for example directly after manufacturing of the chinstrap connector, the chinstrap connector is preferably elongated. In particular the initial condition the first, second and third portion may be generally planar and extend generally parallel to one plane. In this initial condition the chinstrap connector is also in the snap condition. The body has a first major side and an opposite second major side. The first and second major side refer to the chinstrap connector in the initial condition. The body further has a first thickness at the first portion, a second thickness at the second portion and a third thickness and the third portion. Each of the first, second and third thickness are defined between the first and second side. Preferably, the stud protrudes form the first major side, whereas the pin protrudes from the second major side. Accordingly, the stud and the pin may protrude from opposite sides of the chinstrap connector in the initial condition. The third portion preferably forms a living hinge connecting the first and the second portion. The living hinge is formed by one monolithic portion enabling a geometric articulation via deformation of that portion. Preferably, the first, second and third portion are monolithically formed. Thus, the first, second and third portion preferably form one monolithic piece. For bringing the chinstrap connector from the snap condition into the secured condition the pin can be inserted through the through-hole in a direction from the second major side toward the first major side.

In one embodiment the third thickness of the third portion is at least partially or entirely less than each of the first and second thickness of the first and second portion, respectively. Further, the first thickness of the first portion may be greater than the second thickness of the second portion. In particular, the first portion may comprise a recess having a depth corresponding to the second thickness. The recess provides for accommodating at least a part of the second portion therein in the secured condition. Accordingly in the secured condition the second portion does not protrude over the first thickness of the first portion.

In a further embodiment the first portion comprises the receptacle for attaching a strap to the connector. The receptacle is preferably formed by a slotted hole through the first portion. Accordingly, this enables a flat strap to be accommodated therein. The skilled person will recognize other possibilities to attach the chinstrap to the chinstrap connector. For example, the receptacle may comprise a button so that the chinstrap may be buttoned to chinstrap connector. Alternatives are clamp mechanisms, screw connections for example.

In one embodiment the chinstrap connector is molded over an end of the chinstrap. Thus, the chinstrap and the chinstrap connector are irreversibly connected to each other.

In a further embodiment wherein the pin is formed by two pin retainers. The pin retainers serve for retaining the pin at the body when the pin is placed in the through-hole. Each of the pin retainers is preferably formed by a projection having a laterally extending nose. The nose provides for retaining the pin behind the through-hole. The pin retainers are preferably arranged such that the noses extend in opposite directions in the same or generally the same dimension.

Preferably the stud and the pin are configured such that the pin placed in the space between the stud retainers prevents or substantially prevents a movement of the stud retainers toward each other. In particular, the pin preferably has a first width in a first dimension (also referred to as X dimension herein). The first width corresponds or generally corresponds to the distance of the stud retainers in the same dimension. Therefore when the pin is placed in the space between the stud retainers it restricts or prevents a movement of the stud retainers toward each other without urging the stud retainers away from each other. The pin further has a second width in a second dimension (also referred to as Y dimension herein). The second width of the pin is defined between free ends of the noses of the pin retainers. The second width of the pin in the second dimension is preferably greater than the through-hole in the same dimension. Due to the resilience of the pin retainers the second width of the pin is variable, in particular reducible, so that the pin can be urged through the through-hole under reducing the second width of the pin. The pin retainers are further preferably configured to reach sufficiently far through the through-hole to position the noses of the pin outside the through-hole when the pin is inserted in the through-hole. Thus, the noses of the pin can snap behind the first portion of the body and therefore the noses of the pin can retain the pin from detaching from the first portion. The pin retainers may further be dimensioned and spaced relative to each other such that the width defined between portions other than the noses of the pin in the second dimension corresponds to or is smaller than the width of the through-hole in the same dimension.

In an embodiment the stud is generally mushroom-shaped with a slot extending into the mushroom cap toward the mushroom base. Accordingly, the stud may extend at an overall circular cross-section except at the area of the slot. This provides for a relatively secure attachment in a circular aperture of a safety helmet. Further, this provides for a rotatability of the chinstrap connector when attached to a safety helmet. Similar to the configuration of the pin the stud retainers are also formed by protrusions each having a laterally extending nose. In this case the noses of the stud form portions of the mushroom cap. Preferably, the stud extends in a third dimension (also referred to as Z dimension herein). The X, Y and Z dimensions are arranged in accordance to a three-dimensional Cartesian Coordinate system (in which the three dimensions are perpendicular with respect to each other). In the first dimension a width of the stud defined between free ends of the noses is preferably greater than the diameter of the aperture in the safety helmet. Due to the resilience of the stud retainers the width of the stud in the first dimension is variable, in particular reducible, so that the stud can be urged through the aperture under reducing the width of the stud in the first dimension. The stud retainers are further preferably configured to reach sufficiently far through the aperture to position the noses of the stud outside the aperture when the stud is inserted in the aperture. Thus, the noses of the stud can snap behind the protective shell of the safety helmet and therefore the noses of the stud can retain the stud from detaching from the safety helmet. The stud retainers may further be dimensioned and spaced relative to each other such that the width defined between portions other than the noses of the stud in the first dimension corresponds to or is smaller than the width of the aperture in the same dimension.

According to the invention the retention of the pin within the through-hole of the body is mechanically independent from the retention of the stud in the aperture of the safety helmet. Therefore, a mechanical load on the chinstrap (eventually caused from wearing the safety helmet) may urge the stud away from the helmet. However, because the pin is independently retained, that mechanical load may not impact the retention of the pin. Thus, the stud is prevented from loosening even under mechanical load conditions on the stud.

In an embodiment the through-hole is non-circular, in particular rectangular. Therefore the pin, which preferably has a generally rectangular outline, is additionally anti-twist locket when the chinstrap connector is in the secured condition. Therefore any torque or rotational movement performed between the chinstrap connector and the helmet is prevented from causing a rotation between the pin and the stud. Therefore, the pin and the stud are also prevented from inadvertently loosening upon exposure to a rotation or torque.

In embodiments of the invention the through-hole has a diameter of between about 5.5 mm to about 6.5 mm, preferably 6 mm. Further, the stud of the chinstrap connector has preferably a maximum diameter (at the mushroom cap) of between about 6 mm and about 8 mm, most preferably 6.5 mm. In this regard the maximum diameter of the stud is always greater by about 0.5 than the diameter of the through-hole. The stud of the chinstrap connector may have minimum diameter of between about 5.5 mm and about 6.5 mm, preferably 6 mm. The minimum diameter may correspond to a maximum diameter of the mushroom base of the stud. The space between the stud retainers is preferably between about 2 mm and about 3 mm, most preferably 2.4 mm.

In one embodiment the receptacle extends between the first and second major side and laterally thereto toward an outer side of the body so that the body forms a pre-determined breaking wall between the outer side and the receptacle. In particular the receptacle preferably extends entirely through the body in the third dimension. The receptacle preferably forms an elongated slot through the body. The pre-determined breaking wall is preferably formed between the outer side of the body and an end of the longer dimension of the elongated slot. The pre-determined breaking wall preferably has a wall thickness of between about 0.4 mm and about 0.6 mm, preferably 0.5 mm, at a wall height (formed between the first and second major side of the body) of between about 2.5 mm and about 3.5 mm, preferably 3 mm. With these dimensions and with the chinstrap connector being made of polyoxymethylene (POM) the pre-determined breaking wall typically breaks as the pulling force within the cross-section formed by the wall thickness and the wall height exceeds 150 N to 250 N. Thus, a wearer of the helmet is protected against injury, for example, in case the helmet is pulled away from the wearer's head in accident or the like. The body may be recessed in an area forming the pre-determined breaking wall so as to form the pre-determined breaking wall with a height that is smaller than the body dimension adjacent the recess.

In a further embodiment the second portion may on the first major side (the side opposite of the side from which the pin protrudes) comprise an optical indicator. The indicator allows for recognizing that the chinstrap connector is used in the secured condition. In the initial condition the indicator typically faces toward the head of a wearer of a safety helmet to which the chinstrap connector is attached because the first major surface entirely faces the wearer's head. However, in the secured condition the first major side is bent by 180 degrees relative to the initial condition so that the second portion with the indicator faces away from the wearer's head. Therefore the indicator can be recognized from a distance and allows for assessing in which condition the chinstrap connector is used. For example, a supervisor of the wearer or safety person may thus easily check that the chinstrap connector is used in the secured condition during the helmet is worn. The optical indicator may be at least one of a colored area, a logo and a retroreflective material. The colored area may be formed by a bright and/or fluorescent color like fluorescent green or red. Furthermore, the retroreflective material typically reflects light essentially in the direction of the light source. The retroreflective material typically comprises a plurality of glass beads or cube corner prisms provided within a (typically layered) sheeting. The retroreflective material may additionally help maximizing the safety of a wearer under dark light conditions.

In an embodiment the chinstrap connector is made of a plastic material. The plastic material is preferably a poly-oxymethylene (POM). Due to the low water absorption properties POM is relatively dimensionally stable and therefore the pre-determined breaking wall provides for a relative constant force required to brake the pre-determined breaking wall.

An aspect of the invention relates to a method of manufacturing a chinstrap connector of the invention. The method comprises the steps of:
  providing a mold;
  providing a plastic material; and
  injection molding the chinstrap connector as defined according to the invention in the mold from the plastic material in a single shot.

A further aspect of the invention relates to a chinstrap assembly. The chinstrap assembly comprises at least two chinstrap connectors according to the invention and a chinstrap.

The chinstrap may be made of a band or woven plastic fibers, for example made of polyester, although other materials are possible. The chinstrap assembly may further comprise two chinstraps for attachment at opposite ends of a chin cup. Such a chinstrap assembly may comprise four chinstrap connectors for attachment to the ends of the two chinstraps.

A further aspect of the invention relates to a safety helmet comprising a chinstrap connector according to the invention. The safety helmet preferably comprises a protective shell and two apertures on opposite sides of the protective shell. The apertures are preferably arranged in the vicinity of the rim of the helmet with each aperture being available for receiving a stud of one of the chinstrap connectors. Preferably, the safety helmet comprises at least two chinstrap connectors. The safety helmet may comprise a chinstrap. The chinstrap and the two chinstrap connectors may be pre-assembled. In particular, opposite ends of the chinstrap may each be attached to a chinstrap connector. The safety helmet may further comprise at least two plugs for plugging the apertures provided in the safety helmet.

In a further aspect the invention relates to a method of retrofitting a chinstrap to a safety helmet, comprising the steps of:
  providing a safety helmet having an aperture;
  providing a chinstrap assembly according the invention;
  snap fitting the chinstrap connector to the helmet by pushing the stud into the aperture; and
  securing the chinstrap connector at the helmet by pushing the pin into the through-hole.

The safety helmet may be provided by providing a safety helmet which has no apertures and providing the apertures in the safety helmet. The apertures may be provided in the safety helmet by drilling. Further, the apertures may be provided in the safety helmet according to instructions and/or a drill template for appropriate positioning of the aperture.

The invention in a further aspect relates to a kit of parts comprising two chinstrap connectors. The kit may have two chinstrap connectors. The two chinstrap connectors may be linked to each other via a predetermined breaking area. Thus, it can be ensured that the chinstrap connectors are provided pairwise. The kit may further comprise one or more chinstraps for attaching with the chinstrap connectors. Further, the kit may comprise a drill for drilling an aperture in a safety helmet and instructions about drilling an aperture in a particular safety helmet.

DETAILED DESCRIPTION OF THE INVENTION

Figure 1:
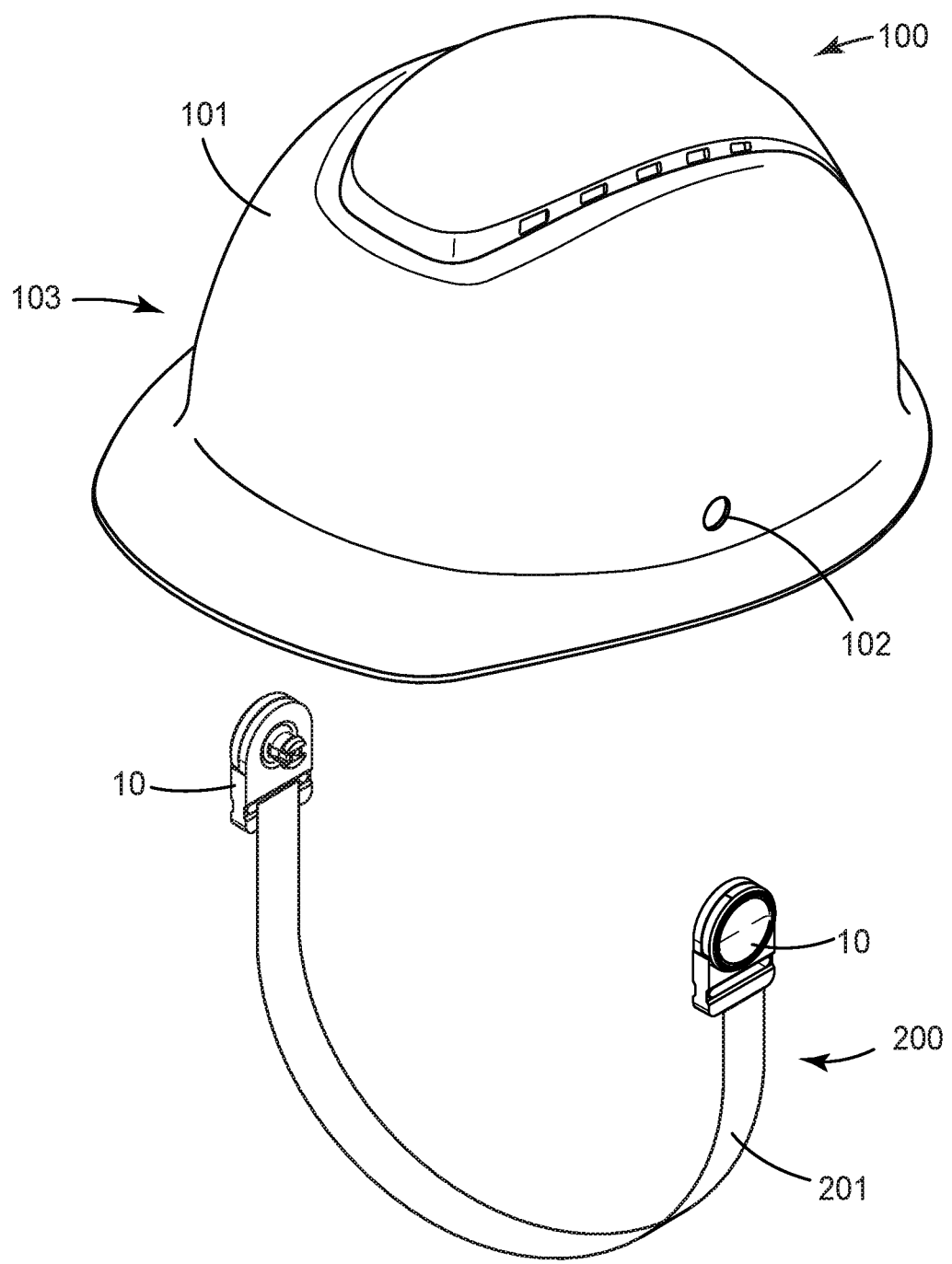
FIG. 1 is a perspective view of a helmet and a chinstrap assembly according to an embodiment of the invention.

FIG. 1 shows a safety helmet 100 as it may be used with the present invention. The Safety helmet 100 has a major protective shell 101 and a suspension system (not illustrated) inside the protective shell. The protective shell is provided with two apertures 102, 103 (only one being visible in this view) arranged at opposite sides of the protective shell 101. The apertures 102, 103 may be provided in the safety helmet by default. The apertures 102, 103 may be plugged by a removable plug if not used. Alternatively, a safety helmet may be provided with an aperture by a user. An aperture may for example be drilled into the protective shell by the user according to instructions that may be provided for particular types of helmets. These instructions preferably define the type and diameter of the drill to be used as well as the type of helmet for which the safety after drilling apertures was tested and confirmed.

A chip strap assembly 200 is provided, which has a chinstrap 201 and two chinstrap connectors 10 attached at opposite ends of the chinstrap 201. Each chinstrap connector 10 can be retained in one of the apertures 102/103 through the helmet's protective shell. Therefore, the chinstrap connector 10 enables attaching or even retrofitting a safety helmet with a chinstrap without the need to provide the helmet with additional parts for receiving the chinstrap connectors.

It is noted that the chinstrap connector of the invention may also be used for chinstraps having a so-called chin cup (not shown). A chip cup is shaped to cover and protect at least a portion of the chin. In a typical configuration two chinstraps are attached to opposite sides of the chin cup and the four ends of the two chinstraps are attached to the helmet. In this example four chinstrap connectors according to the invention may be used with corresponding four apertures in the helmet.

Figure 2:
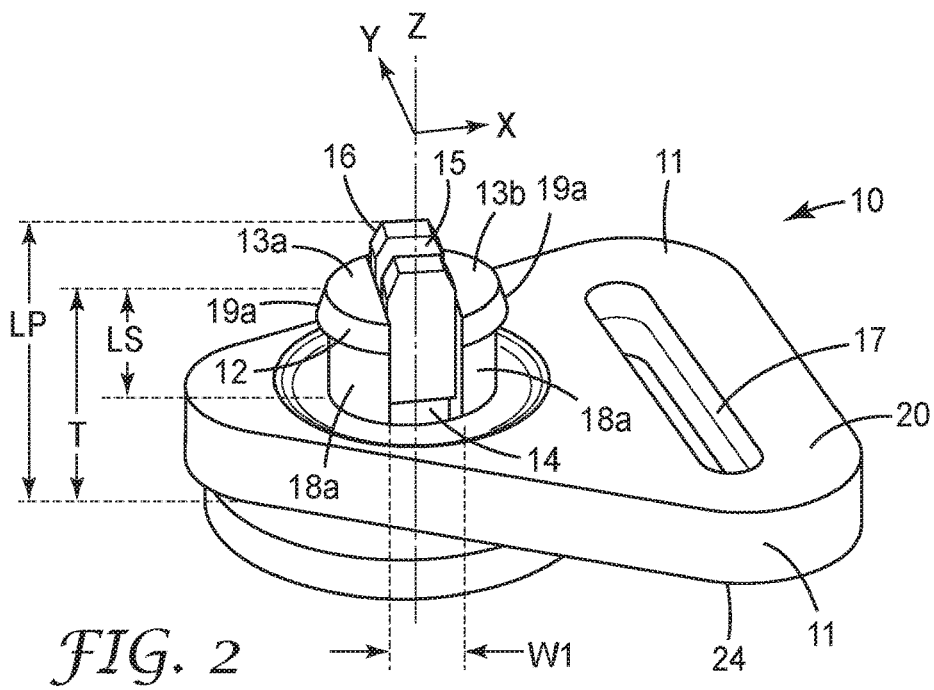
FIG. 2 is a perspective view of a chinstrap connector according to an embodiment of the invention in the secured condition.

FIG. 2 shows the chinstrap connector 10 in more detail. Basically, the chinstrap connector 10 has a receptacle 17 for attaching a chinstrap to the chinstrap connector 10 and a stud 12 which is formed by two spaced stud retainers 13a, 13b. The stud retainers 13a, 13b are formed as resilient projections each having a nose toward their free end. The noses provide the stud 12 with a widened free end. Due to the resilience of the stud retainers 13a, 13b the widened free end can be compressed or reduced in width by bending the stud retainers 13a, 13b toward each other. Thus, the stud 12 can be snapped, for example, in the aperture of a helmet as shown in FIG. 1 so that the widened end snaps behind the protective shell when the stud is pushed through the aperture. The chinstrap connector 10 further has a pin 15 which can be pushed between the stud retainers 13a, 13b for restricting any movement of the stud retainers 13a, 13b toward each other. Accordingly, the chinstrap connector 10 can be used in a snap condition, in which the stud retainers 13a, 13b are resiliently movable toward each other, and a secured condition, in which the stud retainers 13a, 13b are restricted by the pin 15 from moving toward each other.

In more particular, the chinstrap connector 10 shown has a generally flat body 11 from which the stud 12 protrudes, in particular from which the stud retainers 13a, 13b protrude. The Figure shows the chinstrap connector in its initial condition, for example directly after manufacturing (for example injection molding). For bringing the chinstrap connector in the secured condition the initially flat body can be bent by about 180 degrees. Each of the stud retainers 13a, 13b protrudes from a first major side 20 of the body 11 along a dimension Z. Further, a cross-section of each of the stud retainers 13a, 13b is generally L-shaped. The L-shape is provided by a projection 18a/18b that extends from the first major side 20 parallel to the Z dimension, and a nose 19a/19b that extends from the projection 18a/18b transverse to the Z dimension in an X dimension. The noses 19a and 19b further extend in opposite directions away from each other. Thus, the noses 19a and 19b allow for snapping behind the protective shell of a safety helmet once the stud 12 is pushed through the aperture within the protective shell. In other words, the stud 12 has an overall general mushroom shape with the mushroom base extending from the first major side and the mushroom cap forming a free end of the stud 12. The mushroom shape provides for a secure attachment while enabling the chinstrap connector 10 to be rotatable within the aperture in the helmet.

The chinstrap connector 10 further has a through-hole 14 which extends through the body 11. The through-hole opens in the space 16 between the stud retainers 13a, 13b. Preferably, the through-hole 14 has a first width W1 in the X dimension. The first width W1 further corresponds to the distance at which the stud retainers 13a, 13b are spaced. Further, the through-hole 14 has a second width W2 in a Y dimension which is perpendicular to the X dimension. The Y dimension also extends perpendicular to the Z dimension so that the X dimension, the Y dimension and the Z dimension extend in dimensions corresponding to the dimensions of a three-dimensional Cartesian coordinate system. In the example the second width W2 corresponds to the size of each of the stud retainers adjacent the first major side 20 in the same dimension. The through-hole 14 extends through the body 11 at a rectangular cross-section. The through-hole 14 may taper from a second major side 24 of the body 11 toward the first major side 20. This facilitates the insertion of the pin 15 through the through-hole 14 in a direction from the second major side 24 toward the first major side 20 for assembling the chinstrap connector 10 in the secured condition. FIG. 2 shows the chinstrap connector 10 in the secured condition.

Further, the sides of the stud retainers 13a, 13b which face each other form a generally planar surface, and these planar surfaces extend generally parallel to each other. In other words, the mushroom shaped stud 12 has a slot which extends through the mushroom cap toward the mushroom base at a constant width (W1) defined in the X dimension.

The pin 15 has a first width which generally corresponds to the first width W1 of the through-hole. The pin 15 extends at the first width over a major portion of the length over which the pin extends. The first width of the pin 15 is particularly constant over a major portion of the length of the pin 15, except for a chamfer at a free end of the pin 15. This enables mating of the pin 15 and the stud 12 by placing the pin 15 between the stud retainers 13a, 13b without substantially deforming the stud retainers 13a, 13b. Therefore in the snap condition (in which the pin 15 is not placed between stud retainers 13a, 13b) the chinstrap connector 10 can be easily snapped into an aperture of a helmet. Although the noses 19a, 19b (or the mushroom cap) typically form a greater or wider size than the aperture the elastic deformability enables the stud retainers 13a, 13b to bend toward each other until they fit through the aperture as the stud 12 is pushed into the aperture. Once the stud 12 is pushed into the aperture the noses 19a, 19b snap behind the protective shell within which the aperture is formed. The aperture may extend at a circular shape so that the projections 18a, 18b of the stud 12 are rotatable within the aperture. Typically the aperture and the projections 18a, 18b of the stud 12 are sized to form a transition or loose fit. Accordingly, once the stud 12 is arranged with the projections 18a, 18b in the aperture and the noses 19a, 19b arranged outside the aperture the stud retainers 13a, 13b are generally free of any tension. Further, due to the generally same width of the pin 15 and the distance of the stud retainers 13a, 13b, the pin 15 can be assembled between the stud retainers 13a, 13b generally without causing any tension in the stud retainers 13a, 13b. This avoids an assembly of the pin 15 and the stud 12 under tension and prevents the stud retainers 13a, 13b to plastically deform over time. Accordingly, the stud 12 essentially maintains its geometric dimensions independent from whether the pin 15 and the stud 12 are assembled or disassembled. Therefore, any re-assembly even after a long time-period of usage in an assembled state of the chinstrap connector 10 is facilitated.

The length LP of the pin 15 in the example is greater than the length LS of the stud 12 plus the thickness T of the first portion of the body 11. Thus, in the secured condition the pin 15 restricts any movement of the stud retainers 13a, 13b over the full length of the stud retainers 13a, 13b. Further, because the pin 15 sticks out beyond the stud 15 in the secured condition it can be gripped by hand for removing it from the through-hole 14.

Figure 3:
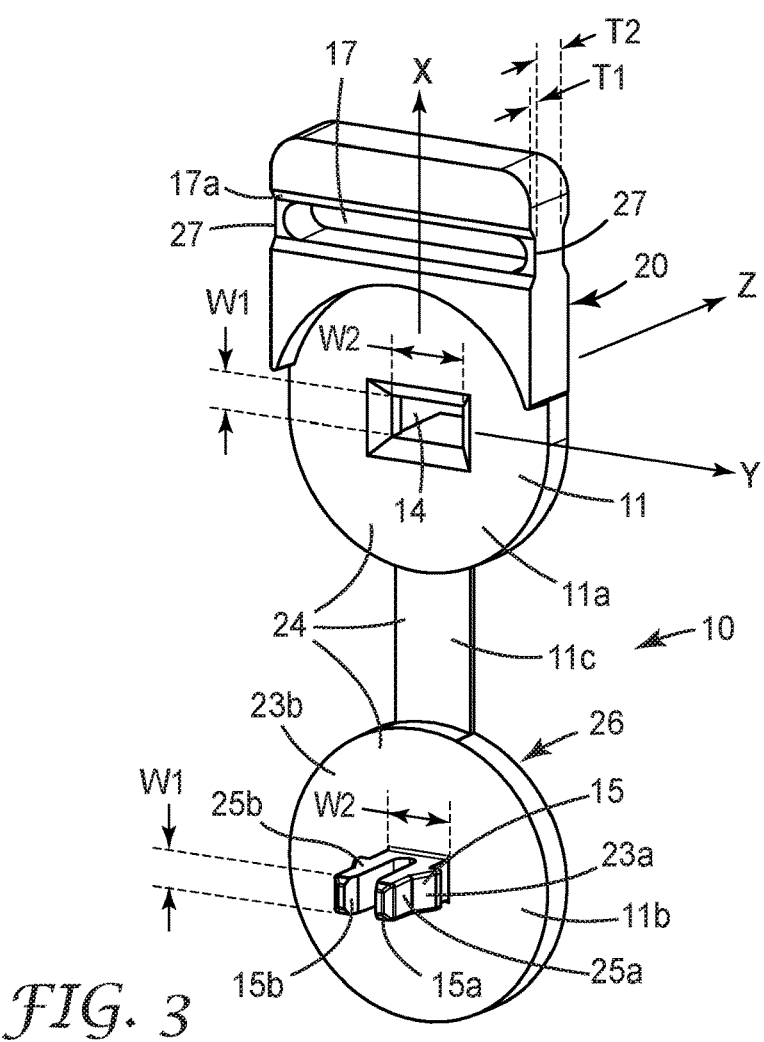
FIG. 3 is a perspective view of a chinstrap connector according to an embodiment of the invention in the initial and snap condition.

Although certain details may not be illustrated or may be illustrated differently in FIGS. 2 and 3 the embodiments shown may have identical technical features. However, the chinstrap connector in FIG. 2 is shown in the secured condition, whereas the chinstrap connector in FIG. 3 is shown in the snap condition.

FIG. 3 shows chinstrap connector 10 in which the body 11 has a first portion 11a, a second portion 11b and a third portion 11c. The first major side 20 of the body including the stud which protrudes therefrom are not visible in this view. The second major side 24 faces the viewer of this Figure. The pin 15 protrudes from the second major side 24. As shown, the pin 15 is formed by two pin retainers 15a, 15b which protrude from the second major side. The pin retainers 15a, 15b are resilient and movable toward each other and comprise noses 23a, 23b which protrude laterally from the projections 25a, 25b in opposite directions. In a partial section of the pin 15 between the noses 23a, 23b and the second major side 24 the pin 15 has an outline which corresponds in size to the size of the through-hole 14. In particular, the pin 15 in this partial section has a second width W2 which generally corresponds to the second width W2 of the through-hole. In contrast, the noses 23a, 23b measured between their free ends in the Y dimension (same dimension as the width W2) form a greater width than the width W2. Therefore, the pin 15 can be snapped into the through-hole 14 so that the noses 23a, 23b snap behind the body 11 on the first major side 20. It is noted that the snapping mechanism (formed by the resilient stud retainers 15a, 15b) for retaining the pin 15 in the through-hole 14 of the chinstrap connector 10 is mechanically independent from the snapping mechanism (formed by the stud retainers 13a, 13b) for attaching the chinstrap connector 10 to the helmet. Therefore any mechanical load of the chinstrap connector 10, for example from wearing the helmet by a user, does not affect the retention of the pin 15 within the through-hole 14. This helps maximizing the safety during wearing of the helmet in that the chinstrap connector 10 is prevented from detaching from the helmet under load caused by the wearing.

The chinstrap connector 10 in the example further recessed area 17a formed by the body 11. In the recessed area 17a the first and second major side 20, 24 form a reduced thickness of the body with respect to a thickness of the body outside the recess. A receptacle 17 for attachment of the chinstrap is formed within the recessed area of the body. Further, the receptacle 17 is formed as an elongated slot having a longer dimension and perpendicular thereof a shorter dimension. The receptacle 17 extends with its longer dimension toward an outer side of the body so that the body 11 forms a pre-determined breaking wall 27 between the outer side of the body 11 and the elongated slot 17. The pre-determined breaking wall 27 has a thickness T1 between the outer side of the body 11 and the elongated slot 17 and a length T2 formed between the first and second major side 20, 24. The pre-determined breaking wall 27 thus has a cross-section T1×T2 which is dimensioned to break if it is exposed to a pulling force acting perpendicular to the cross-section of between 150 and 250 N. This is achieved by selecting the material and dimensions as specified herein.

The third portion 11c of the chinstrap connector 10 forms a living hinge which connects the first portion 11a and the second portion 11b. In the example the third portion 11c is illustrated as an elongated band. The skilled person will however recognize that a shorter and thinner structure may likewise be used as a living hinge. The chinstrap connector 10 with the first, second and third portion 11, a, 11b, 11c as well as with the stud 12 and the pin 15 therefore forms one monolithic piece. This prevents that the pin 15 can be lost and further helps avoiding that the chinstrap connector 10 is used in the snap condition for wearing the helmet. The chinstrap connector 10 further has an optical indicator (not visible), for example a colored area (like a dot or logo). Thus, when the chinstrap connector is attached to a safety helmet in the secured condition the optical indicator faces away from the helmet and can be recognized by another person than the wearer. This enables the other person, for example a safety person, to easily check an appropriate attachment of the chinstrap connector to the safety helmet. Therefore, the chinstrap connector can help maximizing the safety of the wearer.

The invention claimed is:

1. A chinstrap connector for a safety helmet, comprising a receptacle for attaching a chinstrap to the chinstrap connector and a stud for attachment of the chinstrap connector to the helmet, the stud being formed by at least two spaced stud retainers protruding from a body of the chinstrap connector, the body having a through-hole that opens in the space between the stud retainers and a pin which is placeable through the through-hole into the space to restrict a movement of the stud retainers toward each other; wherein wherein the body has a first portion, a second portion and a third portion, the body having a first major side from which the stud protrudes and an opposite second major side from which the pin protrudes, and wherein the third portion forms a living hinge connecting the first and the second portions; and wherein the receptacle extends between the first and second major side and laterally thereto toward an outer side of the body so that the body forms a pre-determined breaking wall between the outer side and the receptacle.

2. The chinstrap connector of claim 1, wherein the first, second and third portion are monolithically formed.

3. The chinstrap connector of claim 1, wherein the first portion comprises the receptacle for attaching a strap to the chinstrap connector.

4. The chinstrap connector of claim 1, wherein the second portion comprises an optical indicator for recognizing that the chinstrap connector is used in the secured condition.

5. The chinstrap connector of claim 4, wherein the optical indicator is at least one of a colored area, a logo and a retroreflective material.

6. The chinstrap connector of claim 1, wherein the pin is formed by two pin retainers for retaining the pin at the body when the pin is placed in the through-hole.

7. The chinstrap connector of claim 1, wherein the stud is generally mushroom-shaped with a slot extending into the mushroom cap toward the mushroom base.

8. The chinstrap connector of claim 1, being made of polyoxymethylene (POM).

9. A chinstrap assembly, comprising two chinstrap connectors according to claim 1 and a chinstrap.

10. A method of retrofitting a chinstrap to a safety helmet, comprising the steps of:
   providing a safety helmet having a chinstrap connector according to claim 1;
   snap fitting the chinstrap connector to the helmet by pushing the stud into the aperture; and
   securing the chinstrap connector at the helmet by pushing the pin into the through-hole.

11. A kit of parts comprising at least two chinstrap connectors according to claim 1.

12. The kit of claim 11, in which two chinstrap connectors are provided linked to each other via a predetermined breaking area.

13. The kit of claim 11, further comprising a chinstrap.

* * * * *